United States Patent
Rizk et al.

(10) Patent No.: US 11,821,738 B2
(45) Date of Patent: Nov. 21, 2023

(54) METHODOLOGY FOR ESTABLISHING TIME OF RESPONSE TO MAP DISCREPANCY DETECTION EVENT

(71) Applicant: GM Cruise Holdings LLC, San Francisco, CA (US)

(72) Inventors: Sarah M. Rizk, San Francisco, CA (US); Yanni Cao, San Mateo, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 64 days.

(21) Appl. No.: 17/518,048

(22) Filed: Nov. 3, 2021

(65) Prior Publication Data

US 2023/0138745 A1  May 4, 2023

(51) Int. Cl.
*G01C 21/34* (2006.01)
*B60W 60/00* (2020.01)
*G01C 21/00* (2006.01)

(52) U.S. Cl.
CPC ....... *G01C 21/3438* (2013.01); *B60W 60/001* (2020.02); *G01C 21/3461* (2013.01); *G01C 21/3804* (2020.08)

(58) Field of Classification Search
CPC ............ G01C 21/3438; G01C 21/3461; G01C 21/3804; B60W 60/001
See application file for complete search history.

(56) References Cited

U.S. PATENT DOCUMENTS

| | | | |
|---|---|---|---|
| 2018/0188037 A1* | 7/2018 | Wheeler | G06F 18/22 |
| 2018/0188044 A1* | 7/2018 | Wheeler | G05D 1/0274 |
| 2018/0188045 A1* | 7/2018 | Wheeler | G06F 18/22 |
| 2019/0019416 A1* | 1/2019 | Perko | G05D 1/0011 |
| 2019/0063928 A1* | 2/2019 | Hasberg | G01S 7/412 |
| 2019/0163176 A1* | 5/2019 | Wang | G05D 1/0027 |
| 2019/0301891 A1 | 10/2019 | Rowitch | |
| 2020/0166363 A1 | 5/2020 | McGavran et al. | |
| 2020/0166364 A1 | 5/2020 | Fujita | |
| 2020/0363214 A1 | 11/2020 | Langhans et al. | |
| 2020/0400441 A1 | 12/2020 | Efland | |
| 2021/0004363 A1* | 1/2021 | Bailly | G06T 17/05 |
| 2021/0302169 A1 | 9/2021 | Xie et al. | |
| 2021/0302170 A1 | 9/2021 | Xie et al. | |
| 2022/0155098 A1* | 5/2022 | Liu | G01C 21/387 |
| 2022/0185316 A1* | 6/2022 | Zhang | G01C 21/3848 |
| 2022/0333950 A1* | 10/2022 | Akbarzadeh | G01C 21/3804 |
| 2022/0341750 A1* | 10/2022 | Akbarzadeh | G01C 21/3841 |
| 2022/0355818 A1* | 11/2022 | Janssen | G06V 20/58 |
| 2023/0017969 A1* | 1/2023 | Mortier | B60W 60/001 |

* cited by examiner

*Primary Examiner* — Faris S Almatrahi
*Assistant Examiner* — Abdalla A Khaled
(74) *Attorney, Agent, or Firm* — Akona IP

(57) ABSTRACT

A methodology is described for determining a time for responding to an initial encounter by a vehicle with a map error in a map segment, wherein the initial encounter is detected by a detector. A method includes identifying an error type associated with the map error, wherein the error type is one of a first error type and a second error type; determining at least one additional factor associated with the initial encounter; determining a response time for the map error based on the error type and the at least one additional factor; and initiating a mitigating action in response to the initial encounter within the response time, wherein the response time comprises an amount of time from the initial encounter with the map error to a time at which a mitigating action should be taken.

18 Claims, 6 Drawing Sheets

METHODOLOGY FOR ESTABLISHING TIME OF RESPONSE TO MAP DISCREPANCY DETECTION EVENT

TECHNICAL FIELD OF THE DISCLOSURE

The present disclosure relates generally to autonomous vehicles. More specifically, the present disclosure relates to systems and methods for determining appropriate service level agreement (SLA) response times to map discrepancy detection events.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. Autonomous technology typically makes use of map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
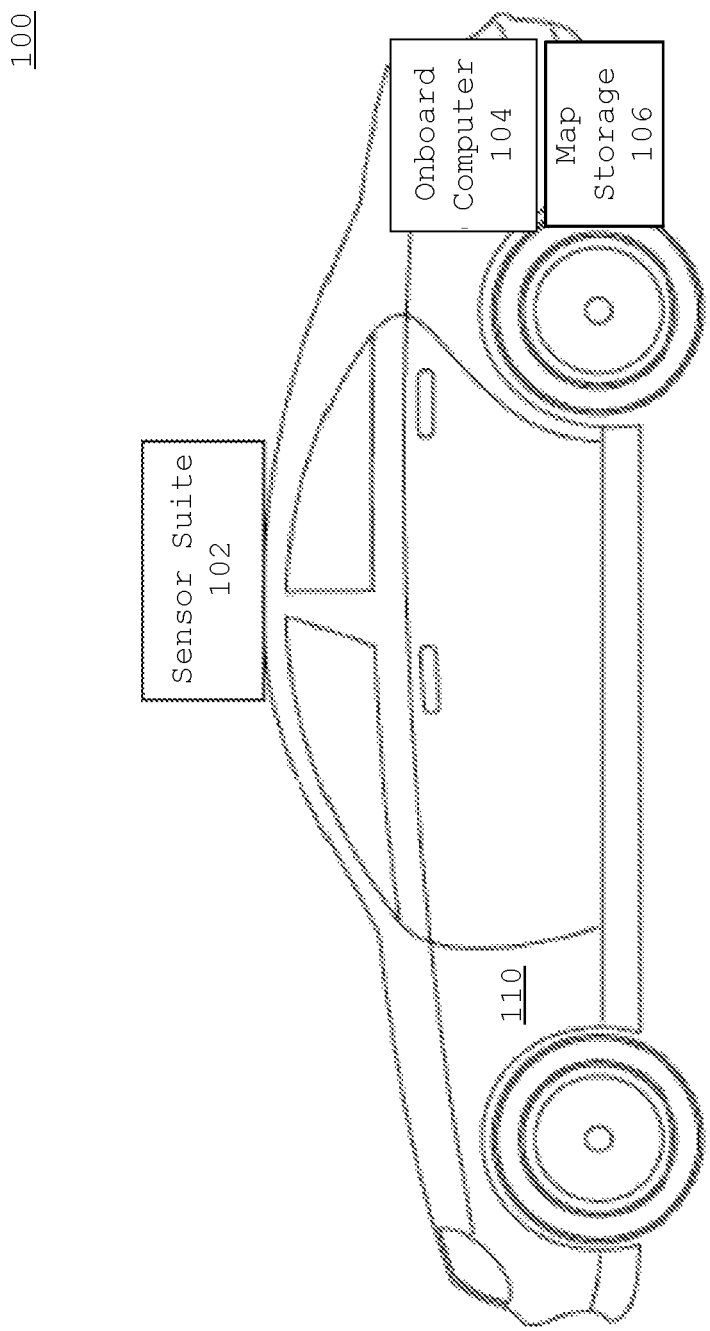
FIG. 1 is a diagram illustrating an autonomous vehicle, according to some embodiments of the disclosure.

The systems, methods and devices of this disclosure each have several innovative aspects, no single one of which is solely responsible for all of the desirable attributes disclosed herein. Details of one or more implementations of the subject matter described herein are set forth below and the accompanying drawings.

It will be recognized that maps are a key component in autonomous vehicle technology. In particular, the highly specialized needs of autonomous vehicles require highly specialized, and high definition, maps that represent the world at a level of resolution one to two orders of magnitude greater than offered by regular web map services that are widely used for turn-by-turn navigation. Such high-resolution is necessary because autonomous vehicles are routinely required to execute complex maneuvers, such as safely navigating and accommodating bike lanes and pedestrian paths along roadways, for example.

An autonomous vehicle mapping system, or database, may include several layers, or types, of maps or mapping information. For example, a mapping database may include a standard mapping layer, a geometric mapping layer, a semantic mapping layer, a map priors layer, and/or a real-time information layer. The standard mapping layer includes mapping information at a level similar/identical to that available from the aforementioned web mapping services. The geometric mapping layer includes three-dimensional (3D) mapping information for defining a drivable portion of a mapped area. The semantic mapping layer builds on the geometric mapping information by adding semantic objects, including two-dimensional (2D) and 3D traffic objects (such as parking spots, lane boundaries, intersections, crosswalks, stop signs, traffic lights) for facilitating driving safety. Semantic objects may include associated metadata, such as speed limits and turn restrictions for lanes, for example. The map priors layer includes derived information about dynamic elements as well as human driving behavior. The optional real-time information layer is typically read/write enabled and is a portion of the mapping database designed to be updated while the autonomous vehicle is providing an autonomous vehicle service and (as its name implies) contains real-time data, such as traffic congestion, newly discovered construction zones, observed speeds, etc. The real-time information is designed to support gathering and sharing of real-time global information among a fleet of autonomous vehicles. From the information in the autonomous vehicle mapping system, map data may be generated that combines one or more of the layers into a semantic map.

Map data typically includes data required by an autonomous vehicle to make driving decisions and is traditionally generated as a data file or data container that includes a semantic map of a geographical area. Such data file or data container may be referred to as monolithic map data.

The geographical area traditionally covered by monolithic map data is, e.g., a city or a country. Map data may be generated at a central computer system, from where it may be uploaded or otherwise installed onto a data storage of the autonomous vehicles, typically located in the autonomous vehicle.

The present disclosure relates to methodologies for detection of discrepancies, or errors, in map data, which may result from changes in or to features (e.g., lane changes, addition or removal of traffic signs, addition or removal of traffic signals) of the mapped area. The methodologies presented herein enable changes to be made to the map data in a manner that adheres to given safety and/or other standards of an autonomous vehicle fleet operator.

According to some aspects of the present disclosure, an SLA response time for a map feature or map segment in which the feature is located may be determined based on an expected encounter rate for the feature or map segment for a targeted percentile and a precision of a detector for detecting changes in the feature. The SLA response time for the map feature/map segment may be based on a maximum number of acceptable exposures to (or encounters with) a change in the feature (creating a map discrepancy or error). The SLA response time for a map feature specifies the amount of time in which mitigating action needs to be taken in response to the detected error. For example, in some embodiments, mitigating action may include designating the map segment in which the map error has been detected as an avoidance area (AA) in the monolithic map data. In certain embodiments, designating a map segment as an AA results in a ticket being issued to alert map technicians or other individuals to review the segment and make changes necessary to correct the map data before removing the AA designation.

In certain embodiments, the expected encounter rate is the time to a next encounter (TTNE) with (or time to next exposure to) the map feature (or a map segment in which the feature is located) for a targeted quartile and signal precision (or simply "precision") of the detector is the true positive rate of the detector. As such, the precision of a detector may be viewed as an indication of the reliability of a positive detection signal from the detector. In other words, the precision of a detector is a ratio of true positive error detections (or "true positives") to total (i.e., true and false) positive error detections by the detector. In some embodiments, SLA response time is measured from event detection to the time that mitigating action needs to be taken in order to ensure system safety.

According to other aspects of the present disclosure, a frequency with which a cadence-based manual map change detection strategy is implemented for targeted map feature (or a map segment in which the feature is located) may be determined based on an expected encounter rate for the map segment, signal precision, and a recall rate of a detector (or combined recall rates of multiple detectors). The cadence-based review frequency establishes a frequency with which a map segment should be proactively reviewed for changes using an automated or human detector dispatched to the geographical area mapped by the map segment via one or more autonomous vehicles in the autonomous vehicle provider's fleet. In certain embodiments, the recall rate of a detector may be viewed as an indication of how many errors the detector actually catches (or conversely, misses). In other words, the recall rate, or simply recall, of a detector is a ratio of true positives to the sum of true positives and false negatives (i.e., missed positives) by the detector. Cadence-based review fills the gap by providing periodic review of targeted map features (and/or map segments in which targeted features are located) to ensure that fewer than a designated maximum number of encounters with a map error occur a designated percentage of time.

Example Autonomous Vehicle for Use in Determining SLA Response Times

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 may be part of a fleet of vehicles for picking up passengers and/or packages and driving to selected destinations. The autonomous vehicle 110 may be configured for ride management by an event host.

The sensor suite 102 includes localization and driving sensors. For example, the sensor suite may include one or more of photodetectors, cameras, radio detection and ranging (RADAR), SONAR, light detection and ranging (LIDAR), GPS, inertial measurement units (IMUS), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite can be used to update a map with information used to develop layers with waypoints identifying selected events, the locations of the encountered events, and the frequency with which the events are encountered at the identified location. In this way, sensor suite 102 data from many autonomous vehicles can continually provide feedback to the mapping system and the high-fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

The autonomous vehicle 110 is preferably a fully autonomous automobile but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

The autonomous vehicle 110 may include a map storage 106 for storing map data. The autonomous vehicle 110 may use the map data in various driving decisions, e.g., in finding optimal routes, in support of detecting objects along a route such as traffic lights, or for predicting behavior of other road users and planning autonomous vehicle behavior.

Example of Autonomous Vehicle Fleet for Use in Determining SLA Response Times

Figure 2:
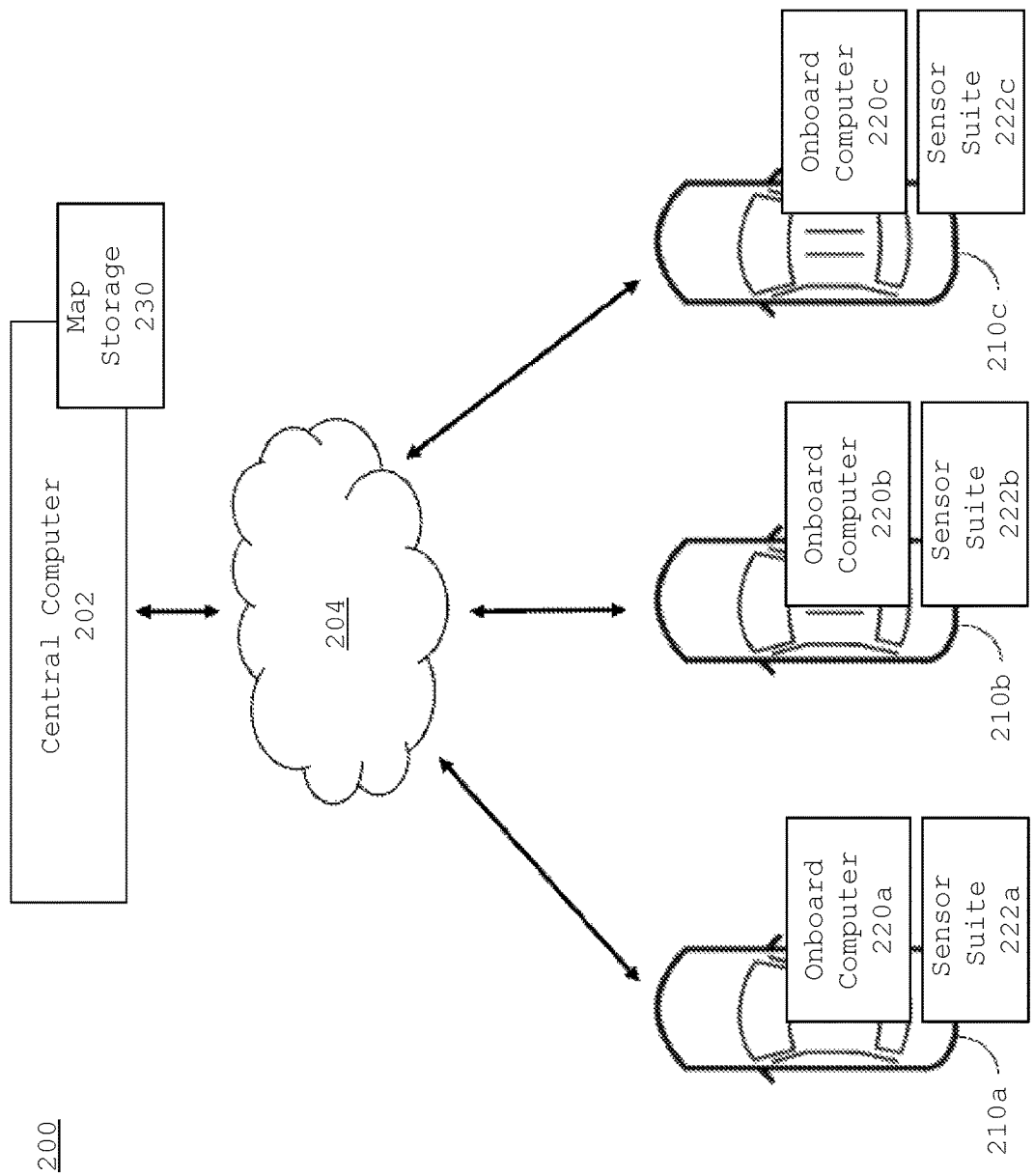
FIG. 2 is a diagram illustrating a fleet of autonomous vehicles in communication with a central computer, according to some embodiments of the disclosure.

FIG. 2 is a diagram 200 illustrating a fleet of autonomous vehicles 210a, 210b, 210c in communication with a central computer 202 according to some embodiments of the disclosure. In various embodiments, central computer 202 may include a fleet management system. As shown in FIG. 2, the vehicles 210a-210c may communicate wirelessly with a central computer 202 and a cloud 204. The central computer 202 may include a routing coordinator and a database of information from the vehicles 210a-210c in the fleet. Each vehicle 210a-210c can include respective onboard computer 220a-220c and sensor suites 222a-222c, which can be similar to the onboard computer 104 and sensor suites 102 of FIG. 1.

Autonomous vehicle fleet routing refers to the routing of multiple vehicles in a fleet. In some implementations, autonomous vehicles communicate directly with each other.

When a ride request is received from a passenger, the routing coordinator may select an autonomous vehicle 210a-210c to fulfill the ride request and generates a route for the autonomous vehicle 210a-210c. As described herein, in some examples, the routing coordinator selects more than one autonomous vehicle 210a-210c to fulfill the ride request. The generated route includes a route from the autonomous vehicle's present location to the pick-up location, and a route from the pick-up location to the final destination. In some examples, the generated route includes a route from the pick-up location to a selected waypoint, and a route from the selected waypoint to the final destination. In some examples, a first autonomous vehicle 210a drives the route to the waypoint and a second autonomous vehicle 210b drives the route from the waypoint to the final destination. In various examples, the route includes multiple waypoints and multiple autonomous vehicles. In some implementations, the central computer 202 communicates with a second fleet of autonomous vehicles, and a vehicle from the second fleet of autonomous vehicles drives the route from the waypoint to the final destination.

Each vehicle 210a-210c in the fleet of vehicles may communicate with a routing coordinator. Information gathered by various autonomous vehicles 210a-210c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest time route for each autonomous vehicle. In some implementations, the routing coordinator uses collected position data to generate a best route for an autonomous vehicle in view of one or more traveling preferences and/or routing goals.

The routing coordinator uses map data to select an autonomous vehicle from the fleet to fulfill a ride request. In some implementations, the routing coordinator sends the selected autonomous vehicle the ride request details, including pick-up location and destination location, and an onboard computer (e.g., onboard computer 220a, 220b, or 220c) on the selected autonomous vehicle generates a route and navigates to the destination. In some examples, the routing coordinator also sends the selected vehicle one or more stops, including a charging station stop, for the autonomous vehicle to recharge. In some examples, the routing coordinator sends a first vehicle the pick-up location and a waypoint location, and the routing coordinator sends a second vehicle the waypoint location and the destination location, such that the passenger switches vehicles mid-ride. In some implementations, the routing coordinator in the central computer 202 generates a route for each selected autonomous vehicle 210a-210c, and the routing coordinator determines a route for the autonomous vehicle 210a-210c to travel from the autonomous vehicle's current location to a first stop.

Example Onboard Computer

Figure 3:
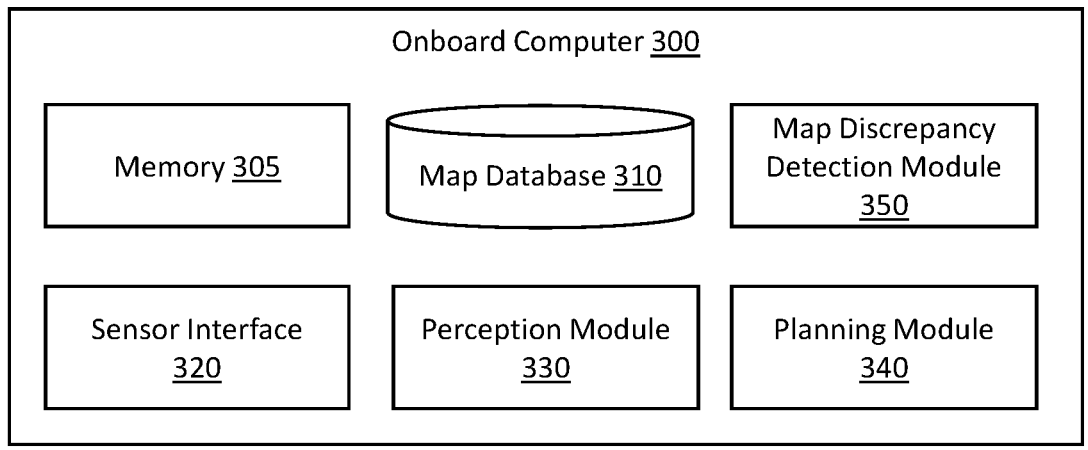
FIG. 3 is a diagram illustrating an onboard computer for an autonomous vehicle, according to some embodiments of the disclosure.

FIG. 3 is a block diagram illustrating an onboard computer 300, which may be used to implement onboard computer 104 (FIG. 1) and onboard computers 220 (FIG. 2) for enabling features according to some embodiments of the present disclosure. The onboard computer 300 may include memory 305, a map database 310, a sensor interface 320, a perception module 330, a planning module 340, and a map discrepancy detection module 350. In alternative configurations, fewer, different and/or additional components may be included in the onboard computer 300. For example, components and modules for controlling movements of the vehicles 110, 210, and other vehicle functions, and components and modules for communicating with other systems, such as central computer 202 and/or cloud 204, are not shown in FIG. 3. Further, functionality attributed to one component of the onboard computer 300 may be accomplished by a different component included in the onboard computer 300 or a different system from those illustrated.

The map database 310 stores a detailed map that includes a current environment of the vehicle. The map database 310 includes data describing roadways (e.g., locations of roadways, connections between roadways, roadway names, speed limits, traffic flow regulations, toll information, etc.) and data describing buildings (e.g., locations of buildings, building geometry, building types). The map database 310 may further include data describing other features, such as bike lanes, sidewalks, crosswalks, traffic lights, parking lots, etc.

The sensor interface 320 interfaces with the sensors in the sensor suite of the vehicle (e.g., sensor suite 140 (FIG. 1)). The sensor interface 320 may request data from the sensor suite, e.g., by requesting that a sensor capture data in a particular direction or at a particular time. The sensor interface 320 is configured to receive data captured by sensors of the sensor suite. The sensor interface 320 may have subcomponents for interfacing with individual sensors or groups of sensors of the sensor suite, such as a thermal sensor interface, a camera interface, a lidar interface, a radar interface, a microphone interface, etc.

The perception module 330 identifies objects in the environment of the vehicle. The sensor suite produces a data set that is processed by the perception module 330 to detect other cars, pedestrians, trees, bicycles, and objects traveling on or near a road on which the vehicle is traveling or stopped, and indications surrounding the vehicle (such as construction signs, traffic cones, traffic lights, stop indicators, and other street signs). For example, the data set from the sensor suite may include images obtained by cameras, point clouds obtained by LIDAR sensors, and data collected by RADAR sensors. The perception module 330 may include one or more classifiers trained using machine learning to identify particular objects. For example, a multi-class classifier may be used to classify each object in the environment of the vehicle as one of a set of potential objects, e.g., a vehicle, a pedestrian, or a cyclist. As another example, a human classifier recognizes humans in the environment of the vehicle, a vehicle classifier recognizes vehicles in the environment of the vehicle, etc.

The planning module 340 plans maneuvers for the vehicle based on map data retrieved from the map database 310, data received from the perception module 330, and navigation information, e.g., a route instructed by the fleet management system. In some embodiments, the planning module 340 receives map data from the map database 310 describing known, relatively fixed features and objects in the environment of the vehicle. For example, the map data includes data describing roads as well as buildings, bus stations, trees, fences, sidewalks, etc. The planning module 340 receives data from the perception module 330 describing at least some of the features described by the map data in the environment of the vehicle. The planning module 340 determines a pathway for the vehicle to follow. The pathway includes locations for the vehicle to maneuver to, and timing and/or speed of the vehicle in maneuvering to the locations.

The map discrepancy detection module 350 interacts with the map database 510, sensor interface 520, and perception module to control and provide various aspects of the functionality and features of embodiments described herein and particularly as described below with reference to FIGS. 6-7.

Example Fleet Management System

Figure 4:
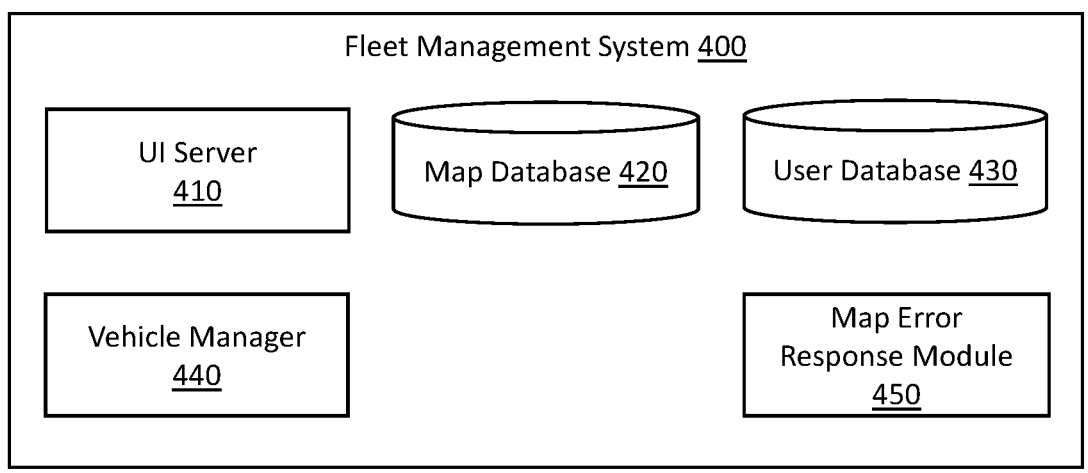
FIG. 4 is a diagram illustrating a fleet management system for managing a fleet of autonomous vehicles, according to some embodiments of the disclosure.

FIG. 4 is a block diagram illustrating a fleet management system 400, which may be implemented by central computer 202 (FIG. 2), according to some embodiments of the present disclosure. The fleet management system 400 includes a user interface (UI) server 410, a map database 420, a user database 430, a vehicle manager 440, and a map error management module 450. In alternative configurations, different, additional, or fewer components may be included in the fleet management system 400. Further, functionality attributed to one component of the fleet management system 400 may be accomplished by a different component included in the fleet management system 400 or a different system than those illustrated.

The UI server 410 is configured to communicate with client devices that provide a user interface to users. For example, the UI server 410 may be a web server that provides a browser-based application to client devices, or the UI server 410 may be a user app server that interfaces with a user app installed on client devices. The UI enables the user to access a service of the fleet management system 400, e.g., to request a ride from an autonomous vehicle, or to request a delivery from an autonomous vehicle. For example, the UI server 410 receives a request for a ride that includes an origin location (e.g., the user's current location) and a destination location, or a request for a delivery that includes a pick-up location (e.g., a local restaurant) and a destination location (e.g., the user's home address).

The map database 420 stores a detailed map describing roads and other areas (e.g., parking lots, autonomous vehicle service facilities) traversed by a fleet of autonomous vehicles, such as vehicles 210 (FIG. 2). The map database 420 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 420 is provided to onboard computers of vehicles in the fleet, such as onboard computer 300 (FIG. 3), as a map database 310 (FIG. 3), described above.

The user database 430 stores data describing users of the fleet of vehicles managed by fleet management system 400. Users may create accounts with the fleet management system 400, which stores user information associated with the user accounts, or user profiles, in the user database 430. The user information may include identifying information (name, user name), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 400. In some embodiments, the fleet management system 400 may infer some user information from usage data or obtain user information from other sources, such as public databases or licensed data sources.

The fleet management system 400 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 400 may obtain a home address from one or more alternate sources. In one example, the fleet management system 400 obtains an address associated with an official record related to a user, such as a record from a state licensing agency (e.g., an address on the user's driver's license), an address from the postal service, an address associated with a phone record, or other publicly available or licensed records. In another example, the fleet management system 400 infers a home address based on the user's use of a service provided by the fleet management system 400. For example, the fleet management system 400 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 400 may look up a candidate home address in the map database 420 to determine if the candidate home address is associated with a residential building type, e.g., a single-family home, a condominium, or an apartment. The fleet management system 400 stores the identified home address in the user database 430. The fleet management system 400 may obtain or identify multiple addresses for a user and associate each address with the user in the user database 430. In some embodiments, the fleet management system 400 identifies a current home address from multiple candidate home addresses, e.g., the most recent address, or an address that the user rides to or from most frequently and flags the identified current home address in the user database 430.

The vehicle manager 440 directs the movements of the vehicles in the fleet managed by fleet management system 400 (e.g., vehicles 210 (FIG. 2)). The vehicle manager 440 receives service requests from users from the UI server 410, and the vehicle manager 440 assigns service requests to individual vehicles. For example, in response to a user request for transportation from an origin location to a destination location, the vehicle manager 440 selects a vehicle and instructs the vehicle to drive to the origin location (e.g., a passenger or delivery pick-up location), and then instructs the vehicle to drive to the destination location (e.g., the passenger or delivery destination location). In addition, the vehicle manager 440 may instruct vehicles to drive to other locations while not servicing a user, e.g., to improve geographic distribution of the fleet, to anticipate demand at particular locations, to drive to a charging station for charging, etc. The vehicle manager 440 also instructs vehicles to return to autonomous vehicle facilities for recharging, maintenance, or storage.

The map error management module 450 manages various aspects of features and functionality of embodiments described herein and particularly as described below with reference to FIGS. 6-7.

Map Feature Discrepancy Detection Event

Figure 5A:
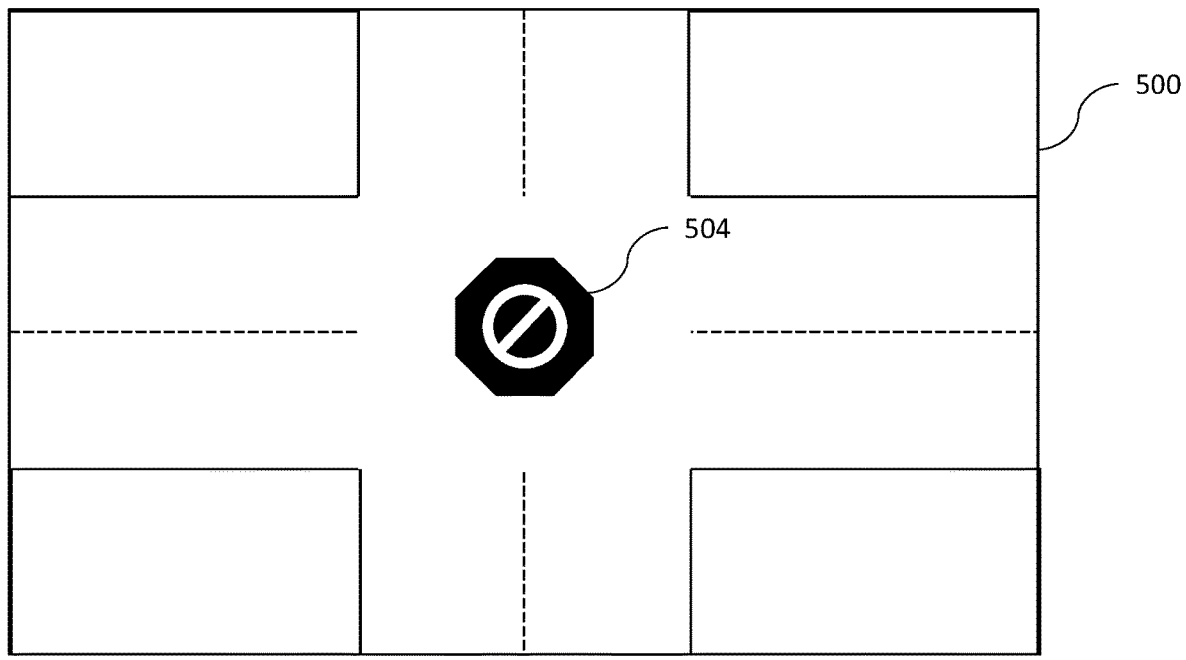
FIGS. 5A-5B collectively illustrate a map feature error in a map segment, according to some embodiments of the disclosure.
Figure 5B:
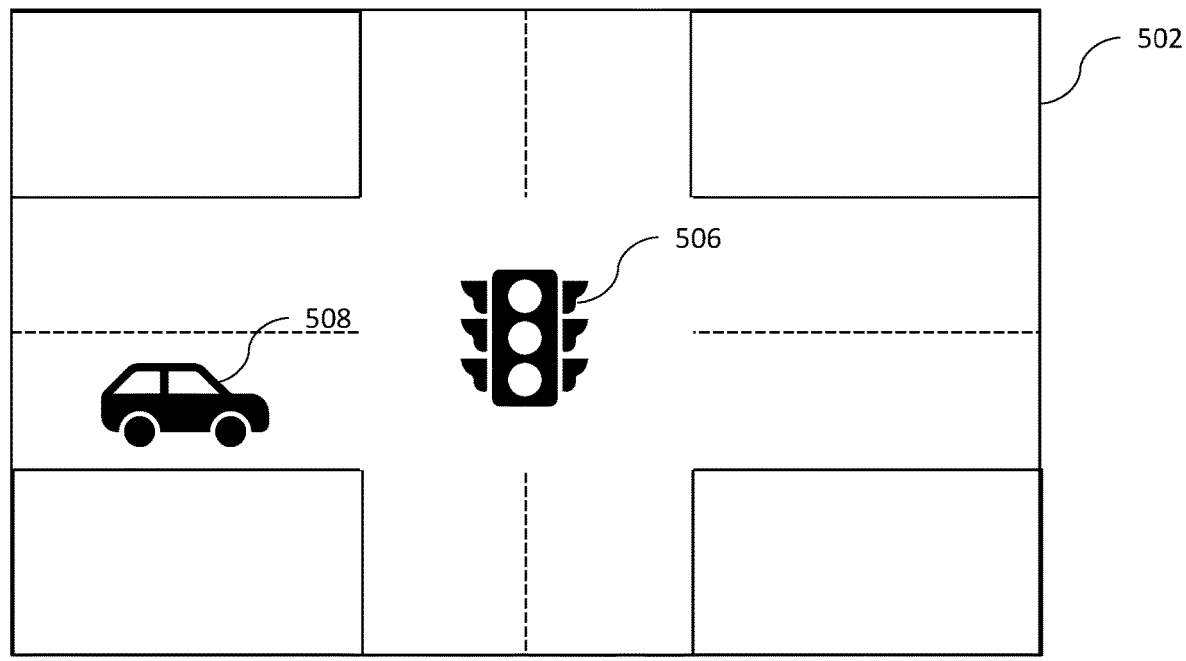

FIGS. 5A-5B collectively illustrate detection and signaling of a map feature discrepancy in a map segment, according to some embodiments of the disclosure. FIG. 5A illustrates an example map data 500 comprising a map segment corresponding to a geographical area 502 (FIG. 5B). As shown in FIGS. 5A and 5B, the map segment includes an intersection; however, it will be recognized that map segments may comprise individual or multiple lanes, a mid-block section, a multi-block section, or any other division of map data.

Referring to FIG. 5A, map data 500 shows a four-way stop 504 provided at the intersection for controlling traversal of traffic therethrough. Conversely, in the geographical area 502 mapped by map data 500, the four-way stop has been replaced by one or more traffic lights 506 for controlling traversal of traffic, including a vehicle 508 (which may be an autonomous vehicle, such as autonomous vehicle 110 (FIG. 1)), through the intersection. In accordance with features of embodiments described herein, an automated detector provided on the vehicle 508 (e.g., as part of the sensor suite) may detect the map feature discrepancy (i.e., traffic light vs. stop sign) caused by the change and provide a signal indicative of the error (e.g., a map error detection event) to a fleet management system, central controller, and/or cloud. Additionally, and/or alternatively, a human riding in the vehicle may also detect note the change and provide human-based signal indicative of the map feature discrepancy to a fleet management system, central computer, and/or cloud.

Encounter Rates

The distribution of autonomous vehicles across a geographical area covered by an autonomous vehicle mapping system is not uniform. Map segments corresponding to geographical areas that are highly trafficked are said to have high encounter rates, meaning that the map segments (and/or features included therein) are often encountered by vehicles. In contrast, map segments corresponding to geographical areas that less overall traffic may be deemed to have low encounter rates, meaning that the map segments (and/or features included therein) are less frequently encountered by vehicles.

For a given map segment and/or feature (depending on the granularity deployed), there is a distribution of TTNE, which in some embodiments may follow a Poisson distribution function. In other embodiments, TTNE may include actual encounter data acquired over time. In certain scenarios, it may be critical from a map safety standpoint to determine what percentile probability needs to be ensured that only a single encounter with a map error (or discrepancy) in map segment occurs.

TABLE 1 below illustrates example encounter rates for an example map segment as a count of a number of times an autonomous vehicle encounters, or drives through, the map segment. For purposes of illustration herein, it will be assumed that encounter rates for a feature in a map segment are the same as for the map segment itself.

TABLE 1

| Encounter Rate (average of d days) | Time to Second Encounter (average) | P50 Time to Second Encounter | P5 Time to Second Encounter |
| --- | --- | --- | --- |
| 1000×/day | 1.4 minutes | X1 minutes | Y1 minutes |
| 100×/day | 14 minutes | X2 minutes | Y2 minutes |
| 10×/day | 2.4 hours | X3 minutes | Y3 minutes |
| 1×/day | 24 hours | X4 minutes | Y4 minutes |
| 1×/10 days | 10 days | X5 minutes | Y5 minutes |
| 1×/100 days | 1000 days | X6 minutes | Y6 minutes |

Map Change Rate

The rate at which map changes occur impact how often a map feature error will be encountered by an autonomous vehicle. In some embodiments, the map change rate for a particular map segment may be calculated by using the number of autonomous vehicle traversals for that map segment divided by map changes within the segment. Map change rates can be applied for specific map segments or a uniform scaling factor can be applied uniformly. For example, to apply a uniform scaling factor, if 90% of all map segments have an expected change rate of once every 50 days or more, this expected change rate may be uniformly applied for all map segments to implement as system that is acceptable at the 90% threshold.

In alternative embodiments, a segment-specific map change rate may be applied to each segment in accordance with the expected number of encounters for the segment. Alternatively, segments with similar map change rates (or with map change rates within a certain range) may be grouped (or "bucketed"), with a single map change rate applied to all of the segments in the bucket.

Methodology for Establishing SLA Response Time

It will be assumed for the sake of example that map safety requirements for a particular map feature dictate that a second encounter with a map feature for which a discrepancy has been detected should be avoided. Using the example shown in TABLE 1 above, for a map segment having an encounter rate of 1×/day, the P50 time to a second encounter with the map feature will be X4 minutes and the P5 time to a second encounter will be Y4 minutes. This means that to prevent a second encounter with the map feature error 50% of the time, a response to the error detection event must occur within X4 minutes. Similarly, to prevent a second encounter with the map feature error 95% of the time, a response to the error detection event must occur within Y4 minutes. Accordingly, the response time (or SLA response time) should be a function of the encounter rate for the map segment and the risk tolerance for $P_Q$ percentile exposure to the map feature error at quartile Q.

It will be recognized that errors in different map features may have associated therewith a different severity of impact; therefore, for each map feature, a risk tolerance of n is assigned, where n is equal to the number of exposure events that may be tolerated. Assuming n is equal to 10 for a particular map feature, while the SLA response time requirement at the P5 level for a map segment having an average exposure of 1/day is Y4 minutes, if 10 exposure events are tolerable for the map feature, the SLA response time does not need to be less than 10*Y4. Accordingly, SLA response time should include a scaling factor for the maximum number of repeat exposure events that are acceptable (i.e., n).

Finally, it will be recognized that various detectors for a particular feature and their error detection signals may have different precision, or true positive, rates. A map feature error detected by a detector that has an 80% true positive rate should not have the same SLA response time as a map feature error detected by a detector with a 99.99% true positive rate. Returning to the above example in which an SLA response time of Y4 is needed to ensure that in 95% of the cases a repeat encounter with a map feature error is prevented (i.e., n=1) in a map segment having an encounter rate of 1×/day, if 80% of detection signals from the map feature error detector yields a true positive, the SLA response time should scale inversely to the precision (or precision rate) of the map feature error detector.

Putting all of this together, an SLA response time requirement may be formulated as:

$$R(P_Q, n) = T(P_Q) * n / \text{Precision}_D$$

where:
$R(P_Q, n)$=SLA for response time (from error detection to mitigation event (e.g., placement of AA));
$P_Q$=percentile threshold being targeted to ensure no repeat encounters;
$T(P_Q)$=TTNE at the targeted percentile threshold $P_Q$;
n=number of acceptable encounters; and
$\text{Precision}_D$=True Positives/(True Positives+False Positives) for detector D.

Figure 6:
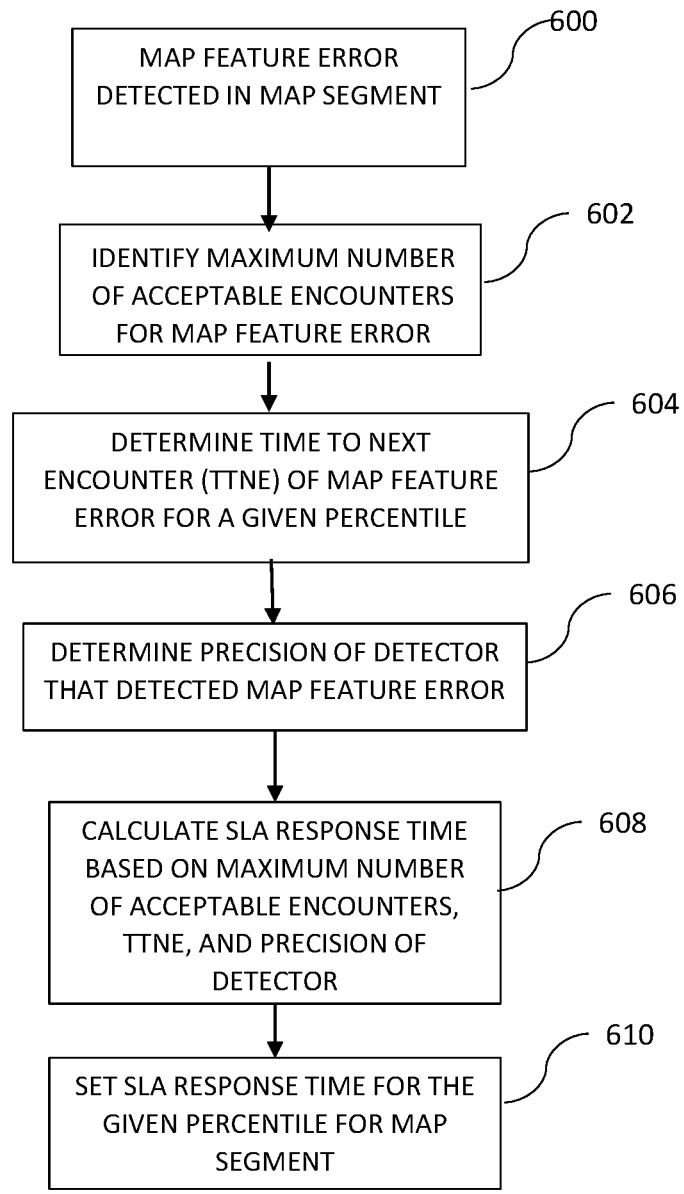
FIG. 6 is a flow diagram illustrating a methodology for determining service level agreement (SLA) response times for a map segment, according to some embodiments of the disclosure.

FIG. 6 is a flowchart illustrating a methodology for establishing an SLA response time to detection of a map feature discrepancy, in accordance with certain embodiments.

In step 600, a discrepancy in a map feature located in a map segment is detected by a detector, which signals the detection event to a fleet management system, a central computer and/or a cloud. It will be recognized that the detector may be an automated detector or may include a human detector.

In step 602, a maximum number of acceptable encounters (n) for the map feature error is identified. It will be recognized that the maximum number of acceptable encounters may be based on the severity of the safety impacts of the map feature error on the autonomous vehicle system. In other words, an error that could result in serious injury to a person or vehicle may be assigned a maximum number of acceptable encounters of n=1, indicating that repeat encounters are unacceptable. For features with high severity outcomes, there will also be several safety systems in place outside the scope of this disclosure to ensure that the single encounter has acceptable safety outcomes. In contrast, an error that will only result in the autonomous vehicle having to take an additional turn, for example, may be assigned a maximum number of acceptable encounters of n=5. Further, an error that will not result in any change to autonomous vehicle driving behavior, for example, may be assigned a maximum number of acceptable encounters of n=10. It will be recognized that the foregoing examples are provided for purposes of illustration only.

In step 604, the TTNE for the map feature (and/or the map segment in which the map feature is located) is determined for a targeted percentile, e.g., as described above with reference to TABLE 1.

In step 606, a precision rate of the detector that detected the map feature error is determined.

It will be recognized that in certain embodiments, one or more of steps 602-606 may be performed by accessing data from a database associated with the autonomous vehicle mapping system in which the relevant information regarding map segments/features may be stored. In certain embodiments, the data may be updated constantly and/or at particular intervals.

In step 608, an SLA response time for the map segment is calculated based on the maximum number of acceptable encounters, the TTNE for the targeted percentile, and the precision of the detector, e.g., using the equation provided above. In particular, the SLA response time may be directly proportional to the maximum number of acceptable encounters and the TTNE for the targeted percentile, and inversely proportional to the precision of the detector.

In step 610, the SLA response time for the targeted percentile is set. In certain embodiments, the SLA response time may be stored in a database associated with the autonomous vehicle mapping system in which the relevant information regarding map segments/features may be stored.

It will be recognized that SLA response time for a segment/feature may be adjusted over time, e.g., in response to revised safety policies or concerns, by targeting a different percentile or as real-world data is updated in the database. Additionally, actual encounter rates, rather than a Poisson distribution based on an average encounter rate, for a segment may be used. The SLA response time for a segment may be stored in the database in connection with the segment such that, when an error in the segment is encountered, the SLA response time dictates the timing with which mitigating action (e.g., designation of the map segment as an AA, issuance of a ticket alerting an individual (e.g., a "mapper") to review the map data and make appropriate changes to the map data to correct the error) must be taken.

Methodology for Establishing Cadence-Based Review Frequency

In accordance with embodiments described herein, a cadence-based review frequency is provided and includes a manual change detection strategy for bridging a gap between change detection signals provided by automated and human detectors and map safety requirements. If detectors were provided for every map feature and each such detector had zero recall errors, then simply setting an SLA response time as described above would be sufficient to guarantee map quality from a change detection perspective; however, real-world detectors have recall errors and some map features lack any sort of detection method at all.

In certain embodiments, a cadence-based review frequency begins with the same premise described above: that for map errors involving certain features, only a single encounter may be tolerated, whereas for map error involving other features, up to n encounters may be tolerated. In addition, to establish an appropriate cadence, the recall rate of existing detectors must be considered.

Consider for the sake of example a map segment for which an SLA response time of 15 minutes has been established. It will be assumed that this SLA response time meets $P_Q$ at the $95^{th}$ percentile and that n equals 1 (meaning only a single encounter with a map feature error in the map segment is acceptable). It will be further assumed that there are both automated detectors (e.g., automated stop sign or traffic light change detectors) and human-based detectors (e.g., remote operator notes and AV driver notes) to help identify changes to a target feature (e.g., stop signs). In various implementations, certain detectors (or types of detectors) may have recall rates that are higher or lower than recall rates of other detectors (or types of detectors). Similarly, certain detectors (or types of detectors) may precision rates that are higher or lower than precision rates of other detectors (or types of detectors).

With no detectors at all, the example map segment would need to be reviewed every 15 minutes to meet the 15-minute SLA response time; however, it is expected that a particular detector that has a recall rate of 90%, will catch 90% of issues within the 15-minute window. The expected number of issues that will not be caught by the detector is one issue every 150 minutes (e.g., out of 10 15-minute windows with issues in each window, only one will be missed). As a result, with only a single detector in place, the map segment would need to be reviewed every 150 minutes, rather than every 15 minutes, to ensure that there is no more than a single encounter (i.e., n=1) with a map feature error involving a stop sign in the map segment.

To generalize the above, for a single detector D:

$$F(D) = (T(P_Q)*n)/(1-\text{Recap})*E_Q$$

where:
F(D)=frequency of cadence-based review, given a single detector D
$P_Q$=percentile threshold being targeted to ensure no repeat encounters;
$T(P_Q)$=TTNE at the targeted percentile threshold $P_Q$;
n=number of acceptable encounters before the feature is detected;
$\text{Recall}_D$=True Positives/(True Positives+False Negatives) for detector D; and
$E_Q$=the expected number of encounters before a real-world change, based on map change rate at targeted quartile Q.

It will be recognized that for various map features, more than one detector may be provided for detecting the feature (and discrepancies in map data related to the feature). For example, there may be multiple detectors provided for detecting changes in (or map discrepancies with respect to) a stop sign feature. For multiple detectors $D_1$-$D_n$, the cadence-based review frequency may be defined as:

$$F(D_1, D_2, \ldots D_n) = (T(P_Q)*n)/((1-\text{Recall}_{D1})*(1-\text{Recall}_{D2})* \ldots *(1-\text{Recall}_{Dn})))*E_Q$$

It will be noted that, as recall rates improve and/or as additional detectors may be provided, the cadence may be dramatically reduced.

Figure 7:
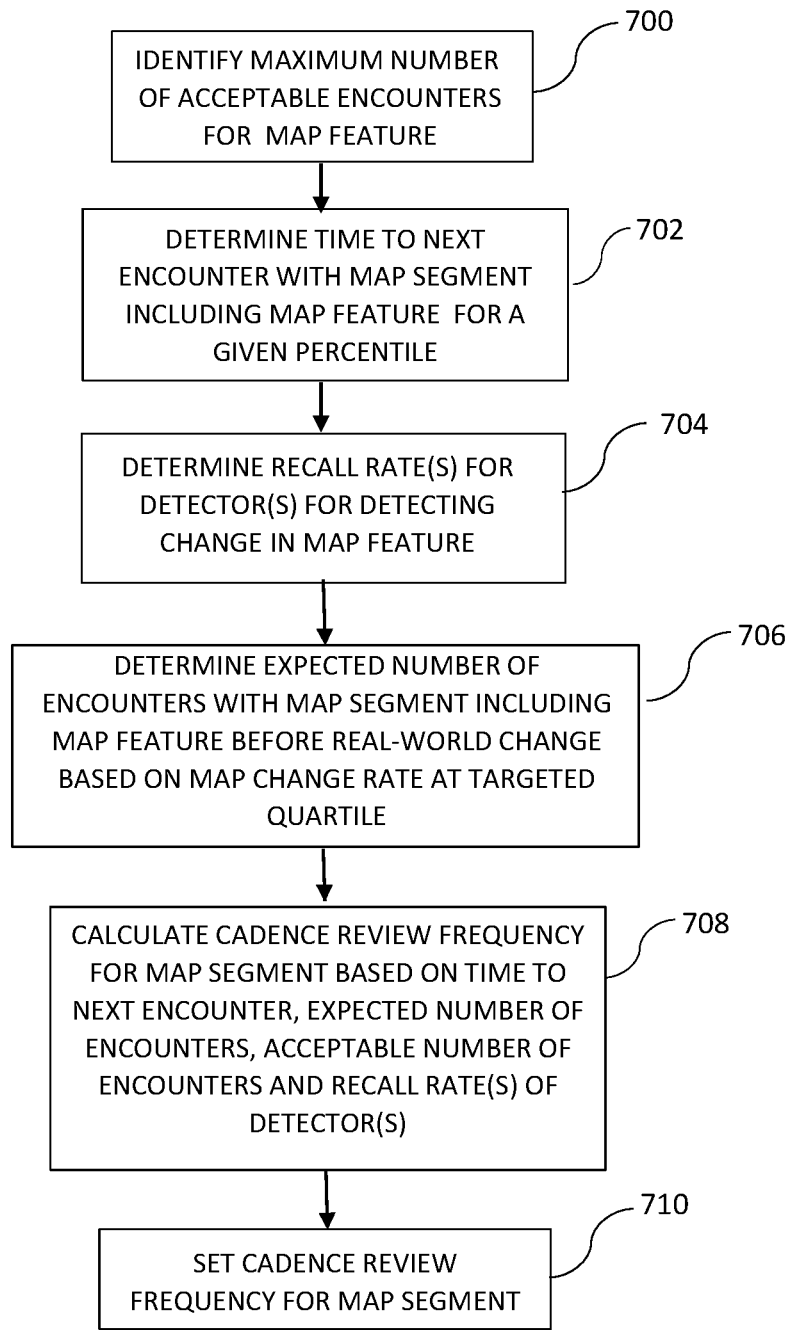
FIG. 7 is a flow diagram illustrating a methodology for determining a cadence review frequency for a map segment, according to some embodiments of the disclosure.

FIG. 7 is a flowchart illustrating a methodology for establishing a cadence-based review frequency for a map segment, in accordance with certain embodiments.

In step 700, a maximum number of acceptable encounters (n) for a particular map feature error is identified. It will be recognized that the maximum number of acceptable encounters may be based on the severity of the safety impacts of the map feature error on the autonomous vehicle system. In other words, an error that could result in serious injury to a person or vehicle may be assigned a maximum number of acceptable encounters of n=1. In contrast, an error that will only result in the autonomous vehicle having to take an additional turn, for example, may be assigned a maximum number of acceptable encounters of n=5. Further, an error that will not result in any change to autonomous vehicle driving behavior, for example, may be assigned a maximum number of acceptable encounters of n=10. It will be recognized that the foregoing examples are provided for purposes of illustration only.

In step 702, the TTNE for the map feature (and/or the map segment in which the map feature is located) is determined for a targeted percentile, e.g., as described above with reference to TABLE 1.

In step 704, a recall rate for each detector for detecting a change in the map feature is determined.

In step 706, an expected number of encounters with the map segment including the map feature before a real-world change occurs, based on the map change rate at the targeted quartile Q is determined.

It will be recognized that in certain embodiments, one or more of steps 700-706 may be performed by accessing data from a database associated with the autonomous vehicle mapping system in which the relevant information regarding map segments/features may be stored. In certain embodiments, the data may be updated constantly and/or at particular intervals.

In step 708, a cadence-based review frequency for the map segment is calculated based on the maximum number of acceptable encounters for the map feature, the TTNE for the map feature, the expected number of encounters before a real world change, and the recall rate(s) for the detector(s). In particular, the cadence-based review frequency may be directly proportional to the maximum number of acceptable encounters, the TTNE, and the expected number of changes before a real world change, and inversely proportional to a product of the complements of the recall rate(s) of the detector(s), as shown in the equation above.

In step 710, the cadence-based response frequency for the targeted percentile is set. In certain embodiments, the cadence-based response frequency may be stored in a database associated with the autonomous vehicle mapping system in which the relevant information regarding map segments/features may be stored. In certain embodiment, a review ticket will be issued in connection with the map segment at the determined cadence-based response frequency, automatically triggering manual review of the map segment.

It will be recognized that the cadence-based review frequency for a segment/feature may be adjusted over time, e.g., in response to revised safety policies or concerns, by targeting a different percentile. Additionally, actual encounter rates, rather than a Poisson distribution based on an average encounter rate, for a segment may be used.

In certain embodiments, map segments with the same review frequency (or with review frequencies within specified range of review frequencies) may be grouped (or "bucketed"), with review tickets being issued for all of the segments in the bucket at a particular time. In this manner, different buckets of map segments may be scheduled for review at different times. It will be anticipated that other methods of scheduling review of map segments at the determined review frequency (an indication of which may be stored in a database in connection with the map segment) may be employed without departing from the spirit or scope of embodiments described herein.

Other Considerations

While as described above, SLA response time and cadence-based review frequency methodologies are based on map segments and/or target features, in certain embodiments, the methodologies may be implemented at a different granularity. For example, map segments/targeted features may be grouped into "buckets" by levels, with the strictest limits (SLA response time and/or cadence-based review frequency) for a member of the bucket being imposed on the entire bucket. In particular, a bucket of map segments near the headquarters of an autonomous vehicle system provider may require a tight SLA response time/cadence-based response frequency regardless of the feature. Similarly, a bucket comprising a particular feature may require a tight SLA response time/cadence-based response frequency regardless of location.

Moreover, safety data may be evaluated over time and SLA response times/cadence-based response frequencies being adjusted (e.g., by targeting a different percentile or using real data) to effect changes as desired. In operation, for SLA response times under 15 minutes, an automated AA placement mechanism may be required to ensure that the response time is met and additional exposures are avoided. Moreover, it is likely that a maximum value for SLA response times (e.g., 1 hour) may be imposed across the system regardless of the value calculated using embodiments described hereinabove. Additionally, map sections may be designated in such a manner that encounter rates of each fall within a particular range, with the result being that map segments in high traffic areas may cover a geographically smaller area and map segments in low traffic areas may cover a geographically larger area. With specific regard to the cadence-based frequency review methodology as described herein, it may be determined that more or less granular approaches are preferable.

As a practical matter, and as mentioned above, the methodologies may be fine-tuned or calibrated by adjusting the targeted tolerance quartile for repeat exposures (i.e., $P_Q$) and/or the maximum acceptable number of exposures for a feature (i.e., n).

Select Examples

The following paragraphs provide various examples of the embodiments disclosed herein.

Example 1 provides a method for determining a time for responding to an initial encounter by a vehicle with a map error in a map segment, in which the initial encounter is detected by a detector, the method including identifying an error type associated with the map error, wherein the error type is one of a first error type and a second error type; determining at least one additional factor associated with the initial encounter; determining a response time for the map error based on the error type and the at least one additional factor; and initiating a mitigating action in response to the initial encounter within the response time.

Example 2 provides the method of example 1, in which the at least one additional factor includes at least one of a time to next encounter (TTNE) including a time until a next encounter with the map error is expected to occur for a targeted quartile, a precision of the detector, and a maximum number of acceptable encounters for the error type of the map error.

Example 3 provides the method of example 2, in which the maximum number of acceptable encounters for the first error type is one.

Example 4 provides the method of example 2, in which the maximum number of acceptable encounters for the second error type is n, where n is greater than one.

Example 5 provides the method of any of examples 1-4, in which the detector includes a human.

Example 6 provides the method of any of examples 1-5, in which the detector includes an automated detector.

Example 7 provides the method of any of examples 1-6, in which the at least one additional factor includes an encounter rate including a time to next encounter (TTNE) including an estimated time until a next encounter with the map error is likely to occur, a precision of the detector, and a maximum number of acceptable encounters for the error type of the map error.

Example 8 provides the method of example 7, in which the response time is directly proportional to the TTNE.

Example 9 provides the method of example 8, in which the TTNE includes an estimated time until the next encounter with the map error is expected to occur at a given percentile based on a Poisson distribution.

Example 10 provides the method of example 7, in which the response time is directly proportional to the maximum number of acceptable encounters for the error type of the map error.

Example 11 provides the method of example 7, in which the response time is inversely proportional to the precision of the detector.

Example 12 provides the method of example 11, in which the precision of the detector includes a ratio of a number of accurate encounter detections by the detector to a number of all encounter detections by the detector.

Example 13 provides the method of any of examples 1-12, in which the response time includes an amount of time from the initial encounter with the map error to a time at which the mitigating action should be taken.

Example 14 provides the method of example 13, in which the mitigating action includes labeling the map segment as an avoidance area and correcting the map error.

Example 15 provides the method of any of examples 1-14, in which the vehicle includes an autonomous vehicle.

Example 16 provides at least one non-transitory computer-readable storage medium including instructions for execution which, when executed by a processor, are operable to perform operations for determining at least one additional factor associated with the initial encounter; determining a response time for the map error based on the maximum number of acceptable encounters and the at least one additional factor; and initiating a mitigating action in response to the initial encounter within the response time; wherein the response time comprises an amount of time from the initial encounter with the map error to a time at which the mitigating action should be taken.

Example 17 provides the at least one non-transitory computer-readable storage medium of example 16, in which the at least one additional factor includes at least one of a time to next encounter (TTNE) including an estimated time until a next encounter with the map error is likely to occur and a precision of a detector that detected the initial encounter.

Example 18 provides the at least one non-transitory computer-readable storage medium of example 17, in which the detector includes a human.

Example 19 provides the at least one non-transitory computer-readable storage medium of claim 17, in which the detector includes a non-human detector.

Example 20 provides the at least one non-transitory computer-readable storage medium of any of examples 16-19, in which the maximum number of acceptable encounters is one.

Example 21 provides the at least one non-transitory computer-readable storage medium of any of examples 16-20, in which the maximum number of acceptable encounters is n, where n is greater than one.

Example 22 provides the at least one non-transitory computer-readable storage medium of any of examples 16-21, in which the at least one additional factor includes a time to next encounter (TTNE) including an estimated time until a next encounter with the map error is likely to occur and a precision of a detector that detected the initial encounter.

Example 23 provides the at least one non-transitory computer-readable storage medium of example 22, in which the response time is directly proportional to the TTNE.

Example 24 provides the at least one non-transitory computer-readable storage medium of example 23, in which the TTNE includes an estimated time until the next encounter with the map error is likely to occur at a given percentile based on a Poisson distribution.

Example 25 provides the at least one non-transitory computer-readable storage medium of example 22, in which the response time is directly proportional to the maximum number of acceptable encounters.

Example 26 provides the at least one non-transitory computer-readable storage medium of example 22, in which the response time is inversely proportional to the precision of the detector.

Example 27 provides the at least one non-transitory computer-readable storage medium of example 26, in which the precision of the detector includes a ratio of a number of accurate encounter detections by the detector to a number of all encounter detections by the detector.

Example 28 provides the at least one non-transitory computer-readable storage medium of any of examples 16-27, in which the mitigating action includes labeling the map subsection as an avoidance area.

Example 29 provides the at least one non-transitory computer-readable storage medium of any of examples 16-28, in which the mitigating action includes correcting the map error.

Example 30 provides the at least one non-transitory computer-readable storage medium of any of examples 16-29, in which the vehicle includes an autonomous vehicle.

Example 31 provides a system for establishing a time for responding to an initial encounter by a vehicle with a map error as detected by a detector, the system including a map database including map data; and a map error response module for interacting with the map database, the map controller configured to determine a maximum number of acceptable encounters associated with the map error, a time to next encounter (TTNE) comprising an estimated time until a next encounter with the map error is likely to occur, and a precision of the detector and to initiate a mitigating action in response to the initial encounter within the response time, in which the map error response module is configured to calculate a response time for the map error based on the maximum number of acceptable encounters associated with the map error, the TTNE, and the precision of the detector.

Example 32 provides the system of example 31, in which map error response module is further configured to designate a portion of data in the map database corresponding to the map error as an avoidance area before expiration of the response time.

Example 33 provides the system of any of examples 31-32, in which the detector includes a human.

Example 34 provides the system of any of examples 31-33, in which the detector includes a non-human detector.

Example 35 provides the system of any of examples 31-34, in which the maximum number of acceptable encounters is one.

Example 36 provides the system of any of examples 31-35, in which the maximum number of acceptable encounters is n, where n is greater than one.

Example 37 provides the system of any of examples 31-36, in which the response time is directly proportional to the TTNE.

Example 38 provides the system of example 37, in which the TTNE includes an expected time until the next encounter with the map error at a given percentile based on a Poisson distribution.

Example 39 provides the system of any of examples 31-38, in which the response time is directly proportional to the maximum number of acceptable encounters.

Example 40 provides the system of any of examples 31-39, in which the response time is inversely proportional to the precision of the detector.

Example 41 provides the system of example 40, in which the precision of the detector includes a ratio of a number of accurate encounter detections by the detector to a number of all encounter detections by the detector.

Example 42 provides the system of any of examples 31-41, in which the vehicle includes an autonomous vehicle.

Example 43 provides the system of any of examples 31-42, in which the response time comprises an amount of time from the initial encounter with the map error to a time at which the mitigating action should be taken.

Example 44 provides the system of any of examples 31-43, in which the mitigating action comprises at least one of labeling the map segment as an avoidance area and correcting the map error.

Other Implementation Notes, Variations, and Applications

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The preceding disclosure presents various descriptions of specific certain embodiments. However, the innovations described herein can be embodied in a multitude of different ways, for example, as defined and covered by the claims and/or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the present disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. If used, the terms "substantially," "approximately," "about," etc., may be used to generally refer to being within +/−20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further includes machine-readable instructions that when executed cause the system to perform any of the activities discussed above.

What is claimed is:

1. A method for determining a time for responding to an initial encounter by a vehicle with a map error in a map segment, wherein the map error comprises a detected discrepancy between map data for a geographic location and a current state of the geographic location as indicated by vehicle sensor data, wherein the initial encounter is detected by a detector, the method comprising:
   identifying an error type associated with the map error, wherein the error type is one of a first error type and a second error type;
   determining at least one additional factor associated with the initial encounter;
   determining a service level agreement (SLA) response time for the map error based on the error type and the at least one additional factor;

initiating a mitigating action in response to the initial encounter within the SLA response time, wherein the mitigating action comprises updating the map data to address the map error;

providing the updated map data to the vehicle; and controlling operation of the vehicle in the geographic location associated with the map error using the updated map data, wherein the SLA response time comprises an amount of time from the initial encounter with the map error to a time at which the mitigating action should be taken, and wherein the at least one additional factor comprises a time to next encounter (TTNE) comprising a time until a next encounter with the map error is expected to occur for a targeted quartile, a precision of the detector, and a maximum number of acceptable encounters for the error type of the map error.

2. The method of claim 1, wherein the maximum number of acceptable encounters for the first error type is n, where n is greater than or equal to one.

3. The method of claim 1, wherein the detector comprises at least one of a human detector and an automated detector.

4. The method of claim 1, wherein the SLA response time is directly proportional to the TTNE.

5. The method of claim 4, wherein the TTNE comprises an estimated time until the next encounter with the map error is expected to occur at a targeted percentile based on a Poisson distribution.

6. The method of claim 5, wherein the SLA response time is directly proportional to the maximum number of acceptable encounters for the error type of the map error.

7. The method of claim 6, wherein the SLA response time is inversely proportional to the precision of the detector.

8. The method of claim 7, wherein the precision of the detector comprises a ratio of a number of accurate encounter detections by the detector to a number of all encounter detections by the detector.

9. The method of claim 1, wherein the mitigating action comprises at least one of labeling the map segment as an avoidance area and correcting the map error.

10. The method of claim 1, wherein the vehicle comprises an autonomous vehicle.

11. At least one non-transitory computer-readable storage medium comprising instruction for execution which, when executed by a processor, are operable to perform operations for determining a time for responding to an initial encounter by an autonomous vehicle with a map error in a map subsection, wherein the map error comprises a detected discrepancy between map data for a geographic location and a current state of the geographic location as indicated by autonomous vehicle sensor data, the map error having associated therewith a maximum number of acceptable encounters, the operations comprising:

determining at least one additional factor associated with the initial encounter;

determining a response time for the map error based on the maximum number of acceptable encounters and the at least one additional factor;

initiating a mitigating action in response to the initial encounter within the response time, wherein the mitigating action comprises updating the map data to address the map error;

providing the updated map data to the autonomous vehicle; and controlling operation of the autonomous vehicle in the geographic location associated with the map error using the updated map data, wherein the response time comprises an amount of time from the initial encounter with the map error to a time at which the mitigating action should be taken, and wherein the at least one additional factor comprises a time to next encounter (TTNE) comprising a time until a next encounter with the map error is expected to occur for a targeted quartile, a precision of the detector, and a maximum number of acceptable encounters for the error type of the map error.

12. The at least one non-transitory computer-readable storage medium of claim 11, wherein the TTNE comprises an estimated time until the next encounter with the map error is likely to occur at a targeted percentile based on a Poisson distribution.

13. The at least one non-transitory computer-readable storage medium of claim 11, wherein:

the response time is directly proportional to the TTNE;

the response time is directly proportional to the maximum number of acceptable encounters; and the response time is inversely proportional to the precision of the detector.

14. The at least one non-transitory computer-readable storage medium of claim 11, wherein the mitigating action comprises at least one of labeling the map subsection as an avoidance area and correcting the map error.

15. A system for establishing a time for responding to an initial encounter by a vehicle with a map error as detected by a detector, wherein the map error comprises a detected discrepancy between map data for a geographic location and a current state of the geographic location as indicated by vehicle sensor data, the system comprising:

a map database comprising map data; and a map error response module for interacting with the map database, the map error response module configured to:

determine a maximum number of acceptable encounters associated with the map error, a time to next encounter (TTNE) comprising an estimated time until a next encounter with the map error is likely to occur, and a precision of the detector;

calculate a response time for the map error based on the maximum number of acceptable encounters associated with the map error, the TTNE, and the precision of the detector;

initiate a mitigating action in response to the initial encounter within the response time, wherein the mitigating action comprises updating the map data to address the map error;

provide the updated map data to the vehicle; and control operation of the vehicle in the geographic location associated with the map error using the updated map data, wherein the response time comprises an amount of time from the initial encounter with the map error to a time at which the mitigating action should be taken, and wherein the at least one additional factor comprises a time to next encounter (TTNE) comprising a time until a next encounter with the map error is expected to occur for a targeted quartile, a precision of the detector, and a maximum number of acceptable encounters for the error type of the map error, and wherein the map error response module is further configured to calculate a response time for the map error based on the maximum number of acceptable encounters associated with the map error, the TTNE, and the precision of the detector.

16. The system of claim 15, wherein the map error response module is further configured to designate a portion of data in the map database corresponding to the map error as an avoidance area before expiration of the response time.

17. The system of claim 15, wherein the detector comprises at least one of a human detector and an automated detector.

18. The system of claim 15, wherein the TTNE comprises an expected time until the next encounter with the map error at a targeted percentile based on a Poisson distribution.

* * * * *